(12) United States Patent
Neuhauser (10) Patent No.: US 12,535,825 B2
(45) Date of Patent: Jan. 27, 2026

(54) DETERMINING THE STATE OF OBJECTS IN AN ASSOCIATION OF OBJECTS

(71) Applicant: Airbus Defence and Space GmbH, Taufkirchen (DE)

(72) Inventor: Tobias Neuhauser, Taufkirchen (DE)

(73) Assignee: Airbus Defence and Space GmbH, Taufkirchen (DE)

( * ) Notice: Subject to any disclaimer, the term of this patent is extended or adjusted under 35 U.S.C. 154(b) by 277 days.

(21) Appl. No.: 18/248,288

(22) PCT Filed: Oct. 5, 2021

(86) PCT No.: PCT/EP2021/077405
§ 371 (c)(1),
(2) Date: Apr. 7, 2023

(87) PCT Pub. No.: WO2022/073980
PCT Pub. Date: Apr. 14, 2022

(65) Prior Publication Data
US 2023/0376048 A1 Nov. 23, 2023

(30) Foreign Application Priority Data
Oct. 9, 2020 (DE) .......................... 102020126564.6

(51) Int. Cl.
*G05D 1/02* (2020.01)
*G05D 1/00* (2006.01)
(Continued)

(52) U.S. Cl.
CPC ............ *G05D 1/0293* (2013.01); *H04W 4/46* (2018.02)

(58) Field of Classification Search
CPC .............................. H04W 4/46; G05D 1/0293
See application file for complete search history.

(56) References Cited

U.S. PATENT DOCUMENTS 6,411,305 B1 * 6/2002 Chui .................... G06T 5/73
345/671
2011/0244881 A1 * 10/2011 Bando ................. G01S 19/46
455/456.1

FOREIGN PATENT DOCUMENTS

CN 111273687 A 6/2020
EP 2363731 A1 9/2011
(Continued)

OTHER PUBLICATIONS

Sae Fujii et al., Cooperative Vehicle Positioning via V2V Communications and Onboard Sensors, IEEE vehicular technology conference (VTC Fall), IEEE, 2011, 1-5.
(Continued)

*Primary Examiner* — Scott A Browne
*Assistant Examiner* — Rami Nabih Bedewi
(74) *Attorney, Agent, or Firm* — Greer, Burns & Crain, Ltd.

(57) ABSTRACT

A method for determining a correction value of a state of an object in an association with a plurality of objects. The method includes: each object in the association recording its own absolute state in an existing coordinate system; a first object in the association recording a relative state of the first object in relation to one or more other objects in the association; the first object transmitting the recorded relative state and its own recorded absolute state via a data connection to one or more of the other objects in the association; exchanging recorded relative states and recorded absolute states in the association of objects so that all objects have the same uniform information status; each object calculating a correction value for all objects in the association based on the uniform information status; an object applying its own correction value to its own recorded absolute state.

8 Claims, 3 Drawing Sheets

(51) Int. Cl.
    *G05D 1/10*     (2006.01)
    *G05D 1/69*     (2024.01)
    *G05D 1/695*     (2024.01)
    *G06F 17/10*     (2006.01)
    *H04W 4/46*     (2018.01)

(56) References Cited

FOREIGN PATENT DOCUMENTS

| EP | 2663731 A1 | 9/2011 |
| FR | 2632755 A1 | 12/1989 |

OTHER PUBLICATIONS

Hao Li et al., Cooperative multi-vehicle localization using split covariance intersection filter; IEEE Intelligent transportation systems magazine, vol. 5, 2013, No. 2, 33-44.
International Search Report for International Patent Application No. PCT/EP2021/077405 dated Dec. 20, 2021; priority document.

\* cited by examiner

DETERMINING THE STATE OF OBJECTS IN AN ASSOCIATION OF OBJECTS

RELATED APPLICATIONS

This application is a national phase of International Patent Application No. PCT/EP2021/077405, filed on Oct. 5, 2021, which in turn claims priority to German patent Application No. 102020126564.6, filed on Oct. 9, 2020, the entire disclosures of which are incorporated by reference herein.

TECHNICAL FIELD

The present description relates to a method for determining a correction value for a state value of an object in an association consisting of a plurality of objects, said method being designed to determine a correction value for the state of an individual object in an association comprising a plurality of objects.

TECHNICAL BACKGROUND

The state of vehicles, for example land vehicles, watercraft or aircraft, is of high importance, particularly in cases where a plurality of vehicles are intended to move in an association. This requires the individual vehicles to have state values that are as precise as possible so that the relative state in relation to other vehicles in the association is known with sufficient precision in either explicit or implicit form.

Particularly in cases where a plurality of vehicles are moving in the association, a fusion of absolute state values which relate to a global or external coordinate system, or to a quasi-static environment, and relative state values which relate to non-static or non-stationary objects (i.e. to the other vehicles in the association of vehicles) is necessary in order to guarantee an intrinsically consistent absolute state estimation of the vehicles in the association of vehicles, or a highly precise, relative state estimation for the individual vehicles. It should be noted that the terms "state estimation" and "state value" are used here as synonyms, since a state value is initially nothing more than a state estimation.

A state or state value can be understood to mean various details relating to a vehicle, such as, for example, position, speed, bearing, relative position in relation to other objects, distance to other objects, relative speed, relative bearing, acceleration, etc.

DESCRIPTION

The present invention can be regarded as being directed to increasing the precision of a relative and absolute determination of the state of objects in an association of objects, or to determine an intrinsically consistent—in relation to the recorded relative state values—absolute determination of the state of objects.

This object may be achieved by the subject-matter of one or more embodiments of the present invention. Further embodiments are set out in additional embodiments and in the following description.

According to one aspect, a method is indicated for determining a correction value of a state of an object. The object is part of an association consisting of a plurality of objects. The method comprises the following steps: each object in the association recording its own absolute state in an existing coordinate system; a first object in the association recording a relative state of the first object in relation to one or more other objects in the association; the first object transmitting the recorded relative state and its own recorded absolute state via a data connection to one or more of the other objects in the association; exchanging recorded relative states and recorded absolute states in the association of objects so that all objects have the same uniform information status; each object calculating a correction value for all objects in the association based on the uniform information status; and an object applying its own correction value to its own recorded absolute state.

The method can be applied in order to determine correction values for a state value for a group of objects. The group of objects corresponds to a plurality of objects. The group of objects can contain mobile and stationary objects, can consist of mobile objects only, or can consist of stationary objects only.

A group consisting of mobile objects only can, for example, be a group with a plurality of vehicles, e.g. land vehicles or aircraft.

A group consisting of stationary objects only is, for example, a group of signalling beacons which are set up close to a runway and transmit a signal in order to support the navigation of vehicles or the landing flight of aircraft. This approach can be used, for example, to support the calibration of a group of stationary ground radar units.

The group of objects represents an association of objects. The mobile objects are, for example, vehicles, such as aircraft or land vehicles which move in the association. The aim is to achieve a consistent absolute determination of the state of the individual objects in the association so that the relative precision derived from the absolute state determination is as precise as possible.

Each object records its own absolute state. Recording the absolute state of an object is understood to mean that sensor values and/or data values (for example data values which are received via a data connection or are read from a memory, wherein the latter values can correspond to a standard value or initialization value) are taken and used to determine the absolute state of an object, wherein the source of the values that are taken and used and any processing steps applied to these values are irrelevant. The values used for recording the absolute state of an object can be measured values (e.g. sensor values) or values received via a data connection or any values such as an initialization value. The values can be present and used as raw data or can initially be subjected to one or more processing steps which are carried out before said values are used to determine the absolute state of an object. This absolute state is recorded in an external coordinate system, for example with recourse to navigation satellites, and in a global coordinate system. The absolute state can contain information such as, for example, position, speed, bearing, etc.

The relative state is recorded by one, a plurality, or all objects in relation to one other, a plurality of other or all other objects in the association of objects, and can be carried out with optical, acoustic or electromagnetic recording units, e.g. via an optical camera, a thermal imaging camera, an ultrasound sensor, a radar system, a lidar system, etc. The relative state indicates how the state of one object is in relation to another object. Generally speaking, the relative state is determined on the basis of measured values and/or received data values.

The relative state and the absolute state are transmitted between the objects in the association, preferably via a wireless connection. A plurality of exclusive connections can be set up in each case between two objects for these purposes. However, it is also conceivable for the objects in the association to provide data for the other objects using a broadcast method (one-to-many or one-to-all).

An equation system for determining the correction value is executed by each object. Each object determines the correction value of the state for each other object in the association by means of the equation system. However, each object uses only its own correction value to correct its own absolute state value.

The correction value is a value which is applied to the absolute value of an object, for example by adding the correction value to the absolute state of an object, or the absolute state of an object is multiplied by a factor, or the absolute state of an object is replaced by a new absolute state.

Alternatively, it is conceivable for an object, or a central unit which does not have to belong to the association but has a data connection to the association and to each individual member of the association, to assume a master role. All values (recorded absolute state values, relative state values recorded by the objects, etc.) are transmitted to this central unit. The central unit solves the equation system and transmits the individual correction values via a data connection to the individual objects.

If a mobile object has not left a movement corridor assigned to it, taking account of uncertainties in the state values, and predefined minimum distances to other objects are not understepped, a control system can perform its function solely on the basis of the corrected state values. In this case, there is no need to use derived relative state values.

The approach described here therefore forms a method for the consistent absolute determination of the state of a plurality of objects (and furthermore, as a result, for the derived relative state determination in relation to the other objects) in an association consisting of a plurality of objects which are designed to determine a correction value for their own absolute state in an association of objects. Assuming that all vehicles remain in an individual movement corridor, taking account of the uncertainty of their own absolute state values, the method enables an adjustment of vehicles moving in formation based only on their own absolute state values, since these absolute state values of the members of the association are consistent in relation to one another and therefore a relative state is redundant in relation thereto.

According to one embodiment, a covariance associated with each state value is also exchanged along with the recorded relative states and the recorded absolute states.

Alternatively, the covariance associated with a state value can be estimated by the receiving members (the objects in the association or the central unit) so that said covariance does not have to be transmitted.

According to a further embodiment, the correction values are calculated in such a way that the absolute state error of the association of objects is minimized.

According to a further embodiment, the correction value is used in a filter of at least one object in order to correct a state value of this object.

The state value is a replication or representation of the state of an object. The state value can contain a plurality of individual values, so that the totality of the individual values represents a multiplicity of individual information elements and describes the entire relevant state of an object. The correction value is therefore used locally in an object in order to correct the state value of this object.

In particular, all members of the association correct their state values simultaneously using the correction values in order to avoid inconsistencies until the time when all members have carried out the correction.

The filter used here can, for example, be a Kalman filter. Other suitable filters can be used.

A simultaneous correction of the state values is to be understood to mean that the correction values are corrected by all members within a predefined time period or the correction is carried out within a deterministic number of work cycles.

According to a further embodiment, a state value of the absolute state and/or the relative state contains information relating to one or more of the following parameters of an object: Position, speed, bearing, acceleration, rotational speed, relative position, relative distance in relation to one or more other objects, relative speed in relation to one or more other objects, relative bearing in relation to one or more other objects.

An optical camera can be used, for example, to record the relative position in relation to other objects by determining and using azimuth and elevation.

According to a further embodiment, a correction value is calculated in such a way that new absolute state values resulting therefrom reconstruct the recorded relative state values of a first object i in relation to a second object j and therefore a relative geometry of the objects in the association in relation to the absolute state values by applying the following equation:

$$\check{z}_{ij}=h((x_{old,j}+\delta x_j)-(x_{old,i}+\delta x_i))$$

where $\delta x_j$ are correction values which are calculated in such a way that the new absolute states $x_{new,i}=x_{old,i}+\delta x_i$ resulting therefrom reconstruct the recorded relative state values $\check{z}_{ij}$ of object i in relation to object j, and therefore the relative geometry of the association.

According to a further embodiment, the boundary condition that a sum of the correction values is equal to zero applies.

The sum of the correction values can be a simple sum of the correction values.

Alternatively, the correction values can be weighted in the sum by means of the inverse of the covariance of the correction values.

According to a further aspect, a method is indicated for determining a correction value of an absolute state of an object in an association consisting of a plurality of objects. The method comprises the following steps: each object in the association recording its own absolute state in an existing coordinate system; a first object in the association recording a relative state of the first object in relation to one or more other objects in the association; the first object transmitting the recorded relative state and its own recorded absolute state via a data connection to a central unit so that the central unit contains all recorded absolute and relative states of the objects in the association; the central unit calculating a correction value for the state of each object in the association based on the absolute and relative states of all objects in the association; transmitting the correction values to the respective object in the association; each object in the association applying its own correction value to its own recorded absolute state.

The method according to this aspect corresponds to the method as described above with the difference that the correction value is not determined by the individual members of the association, but by a central unit which assumes a master role. The central unit can itself be a member of the association or it may only have a data connection to the association, but is not itself a member of the association.

Generally speaking, the central unit carries out the same steps as above with reference to the first variant of the method in order to determine the correction value. The difference is that, in this variant of the method, the calculation is not carried out locally, but instead centrally and at one location, and the members of the association are then supplied with the corresponding correction values.

The features described above with reference to the first variant of the method apply accordingly to the second variant of the method also, even without said features being repeated at this juncture.

According to a further aspect, a vehicle is indicated. The vehicle has a recording unit, a first filter unit, a second filter unit and a monitoring unit. The recording unit is designed to record absolute and relative state values of the vehicle, wherein the recording unit has one or more sensors for determining an absolute and a relative state, and wherein the recording unit has a data interface which is designed to transmit its own relative and absolute state values and to receive relative and absolute state values from objects in an association. The first filter unit is designed to process the absolute and relative state values recorded by the recording unit in order to determine a corrected absolute state value and a corrected relative state value of the vehicle in relation to other objects in the association with the method according to one of the embodiments described above. When the corrected absolute and relative state values are determined, a correction value, in particular, is used which has been determined by means of a computing unit for correction value calculation based on absolute state values and relative state values in relation to other objects. The second filter unit is designed to process the absolute and relative state values recorded by the recording unit in order to determine a relative state value in relation to other vehicles as an output value. The monitoring unit is designed to monitor the status of the first filter unit and the second filter unit. The monitoring unit is designed to forward the corrected absolute state value and the corrected relative state value from the first filter unit if a normal operational state has been identified for the first filter unit, or otherwise to forward the output value from the second filter unit for the relative state value if an incorrect operational state has been established for the first filter unit.

It is also conceivable for the monitoring unit to forward the output value of the second filter unit instead of the corrected state values of the first filter unit if an estimated relative precision of the second filter unit is better than the estimated relative precision of the first filter unit.

The vehicle receives state values from mobile objects (vehicles, e.g. land vehicles or aircraft) or from stationary objects which, together with the vehicle, form an association so that the vehicle knows the relative and absolute state values of other objects in order to allow these state values to be incorporated into the calculation of the correction values.

According to one embodiment, the monitoring unit is designed to categorize the status of the first filter unit as an incorrect operational state if no data connection is set up via the data interface of the recording unit.

The output value of the first filter unit is used, i.e. forwarded by the monitoring unit, only if the first filter unit operates correctly and also receives relative state values and absolute state values from other objects. The relative state values are otherwise forwarded by the second filter unit, wherein the second filter unit is designed so that data which are recorded by its own platform are sufficient for determining the relative state values, i.e. relative state values and absolute state values from other platforms (objects) do not have to be used to determine a relative state value.

According to one embodiment, the vehicle is an aircraft.

The aircraft can be a manned or unmanned aircraft, in particular an aircraft that is used to carry out any type of mission in an association with a plurality of other aircraft.

BRIEF DESCRIPTION OF THE FIGURES

Exemplary embodiments are described in detail below with reference to the attached drawings. The illustrations are schematic and are not true-to-scale. The same reference signs refer to the same or similar elements. In the drawing.

DETAILED DESCRIPTION OF EXEMPLARY EMBODIMENTS

Figure 1:
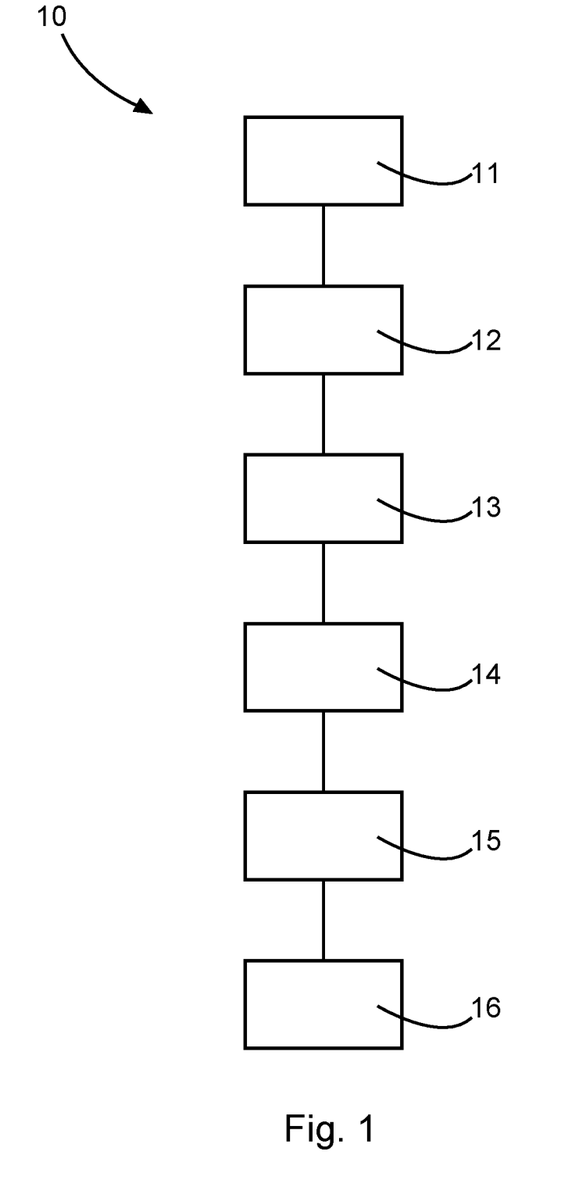
FIG. 1 shows a schematic illustration of the steps of a method according to one exemplary embodiment.

FIG. 1 shows schematically the steps of a method for determining a correction value of a state of an object in an association consisting of a plurality of objects.

In a first step 11, each object in the association records its own absolute state value in an existing coordinate system. In a further step 12, a first object in the association records the relative state of this first object in relation to one or more other objects in the association. In a further step 13, the first object transmits the recorded relative state and its own absolute state via a data connection to one or more of the other objects in the association. In a further step 14, recorded relative states in the association of objects are exchanged so that all objects have the same uniform information status. In a further step 15, each object calculates a correction value for all objects in the association based on the same uniform information status. In a further step 16, an object applies its own correction value to its own recorded absolute state.

The method thus provides a correction value for the absolute state value of an object in order to achieve a consistent absolute state estimation in the association. In addition, the error of the absolute state values of the association as a whole is minimized by the method.

The state of an object can refer, in particular, to the speed and the position of an object, such as e.g. a land vehicle, a watercraft or an aircraft. The absolute state contains information relating to the position, speed, bearing, etc., while the relative state contains information relating to the relative position, relative distance, the relative speed and relative bearing in relation to other objects, etc.

Particularly in cases where a plurality of vehicles are moving in an association, an absolute determination of the state of the vehicles with the highest possible relative precision is helpful, from which the relative states can in turn be derived. The recorded relative state values are processed with the absolute state values for this purpose in order to obtain a correction value which is applied by means of a filter or a predictor-corrector method in order to correct the absolute state value.

The absolute state can be estimated in a filter by means of one or more navigation methods. Satellite navigation methods, for example, can be used, such as, for example, GPS, GLONASS, Beidou, Galileo, which can be summarized under the heading of global navigation satellite system, GNSS. Other navigation methods which can be used here are, for example, an inertial navigation or environment correlation navigation method, such as, for example, Terrain Referenced Navigation, TRN. The inertial navigation system outputs a state of the vehicle and is typically fused with GNSS navigation methods, wherein the inertial navigation system provides the state values at a higher update rate and with less noise than a GNSS method is capable of providing. The position, speed and bearing solution of an inertial navigation system is subject to "drift", i.e. the solution that is output degrades over time, this being inherent in the nature of the inertial navigation method and therefore requiring correction. GNSS navigation methods also contain measurement errors which may require correction.

In order to determine a suitable correction value, at least one object in the association of objects records the relative state in relation to other objects in the association and provides this relative state together with its own absolute state and the associated covariances for the recorded absolute and relevant state values via a data connection to some or all of the other objects in the association. In this connection, a timestamp can also be used for the individual state values, which also requires a global time synchronization between the members of the association, for example by means of initially or continuously synchronized high-position clocks. Measured values are exchanged recurrently between the members of the association. The totality of the absolute and relative state values and further of the associated covariances is then used to determine a correction value in each case for the objects in the association. All objects in the association must perform the determination of the correction value or correction values based on the same uniform information status. The correction value associated with its own object is applied by means of a filter or a predictor-corrector method in order to correct its own state value.

The approach described here ensures that the absolute determinations of the states of the objects in the association are consistent with one another so that the relative states are reconstructed, apart from a residual error, and therefore the determined states of the objects reflect the physical, actual relative geometry as precisely as possible, wherein the term geometry used here is not restricted to the position domain, but also comprises speed, bearing, etc. If both access to GNSS and the data connection between the objects in the association which simultaneously provide absolute state values and relative state values are available, this offers the highest absolute and, at the same time, relative precision of the state values. If no drift-free absolute navigation method is available, but the data connection between the objects is present, the absolute states can at least still be determined consistently so that the relative precision in relation to the determined absolute states is maintained even though the absolute state values can have an error which can even increase over time, for example due to the drift of an inertial navigation system. However, if at least one member of the association has access to a drift-free absolute navigation method, e.g. TRN, this information is implicitly contained in the absolute state determination due to the filter and is therefore exchanged via the data connection with the other members of the association and is therefore incorporated into the calculation of the correction value so that the error of the absolute state values of the entire association remains limited. If the data connection has failed, but absolute navigation methods such as GNSS and/or TRN are available to the members of the association, the geometry of the association can be maintained in relation to the absolute state values, wherein the amount of the relative error turns out to be less than that of the absolute error, since the absolute navigation methods of the association members are affected by similar, local error contributions which compensate one another—a fact which can be further exploited, for example, through the use of the same navigation satellites for GNSS. If both the data connection and GNSS data are unavailable due to a fault or for operational reasons, and also no alternative absolute navigation methods are available to the members, the absolute state determination and further the derived relative state determination by means of the inertial navigation system are initially maintained, but this degrades over time and, if necessary, the monitoring unit switches over to the second filter if the degradation of the first filter has progressed to the extent that the relative precision of the second filter exceeds that of the first filter.

The method described here uses the notion that consistency is desired between the determined absolute state values of the members of the association so that these absolute state values reconstruct the recorded relative state values of the association. Input values for flight control are normally the absolute state values, provided that the intended (flight) corridor, taking account of the uncertainty of the absolute states, is not left and the minimum distances in relation to the relative states derived from the absolute states are not understepped. The flight control otherwise makes adjustments on the basis of determined relative state values which have been derived from the absolute state values or have been determined directly by the second filter unit.

Figure 2:
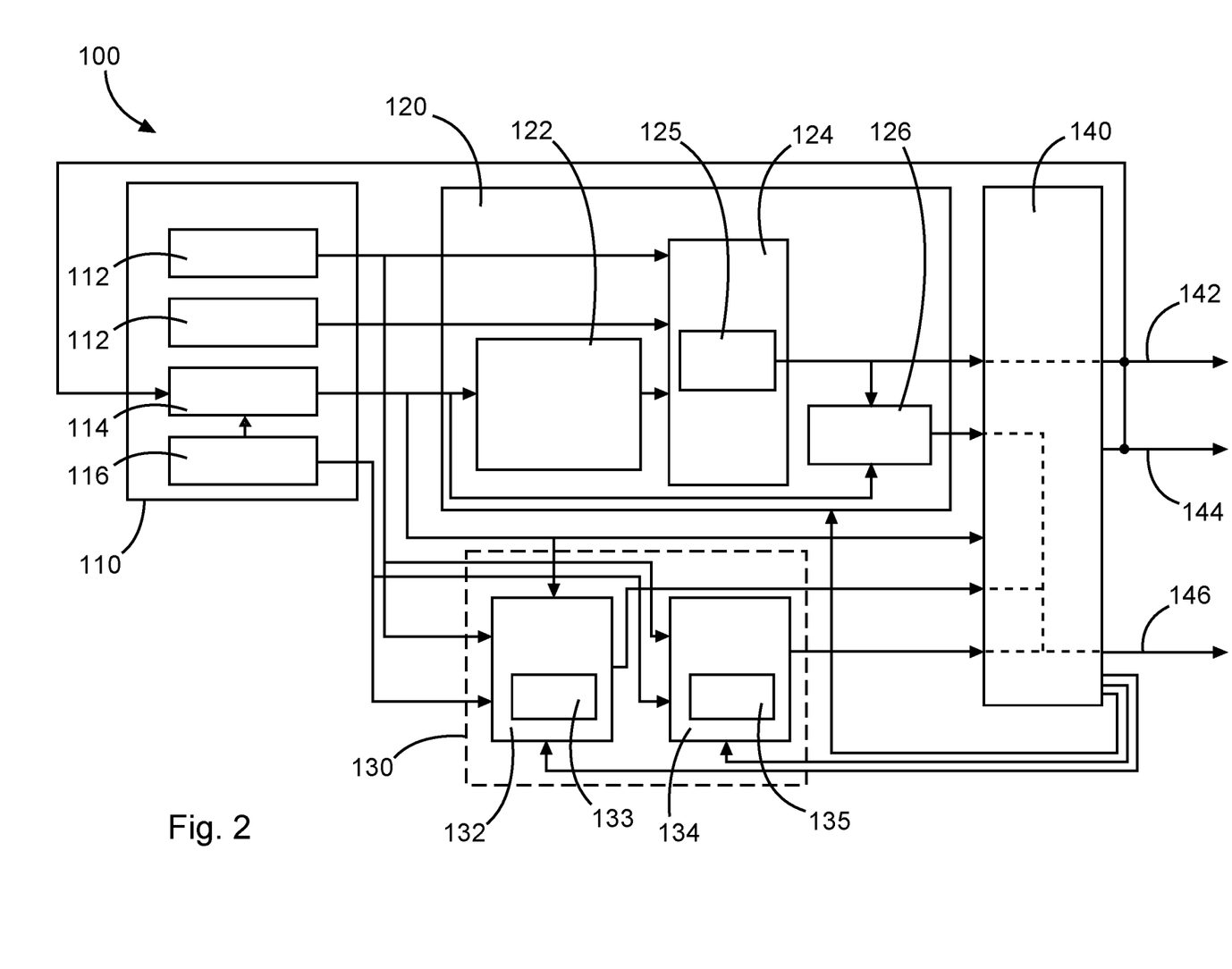
FIG. 2 shows a schematic illustration of the functional modules of a vehicle according to a further exemplary embodiment.

FIG. 2 shows the functional structure of an object 100, here in the form of an aircraft. It should be noted that the reference to an aircraft does not mean that the description is restricted to an aircraft. The aircraft is used instead merely as an example, and the principles described here apply equally to any type of vehicles, i.e. to watercraft and land vehicles also, and also to a combination thereof. An aircraft can be understood to mean a manned or unmanned aircraft. The aircraft can also be a guided missile, rocket, or ballistic object.

A stationary object can be modified slightly compared to the structure shown in FIG. 2. A stationary object can thus dispense with a second filter unit and can otherwise have a functionally identical structure.

The aircraft 100 has a recording unit 110 which is designed to record a state of the aircraft and provide corresponding state values, and also a data interface 114 to exchange absolute and relative state values and further covariances of the absolute and relative state values. The aircraft 100 has a first filter unit 120 and a second filter unit 130, and also a monitoring unit 140.

The recording unit 110 has one or more units 112 for absolute navigation methods which supply or update an absolute state value. In an association consisting of a plurality of mobile objects, not all mobile objects need to have a unit 112 for absolute navigation methods. A GNSS navigation method, inter alia, and/or TRN can be used for the unit 112 in order to provide an absolute state value, and an inertial navigation system which updates the state values on the basis of the measured accelerations and rotational speed of the vehicle. The recording unit further has one or more sensors 116 which determine a relative state in relation to other objects in the association. In an association consisting of a plurality of mobile objects, not all mobile objects need to have a sensor 116. The sensor 116 can have optical, acoustic or electromagnetic sensors, e.g. an optical camera and/or a thermal imaging camera and/or an ultrasound sensor and/or lidar and/or radar and/or time-of-flight measurement by means of the data connection. The recording unit 110 has a data interface 114 via which it can transmit to other objects and receive from these other objects the absolute state values and/or relative state values relating to the relative state in relation to other objects which it has itself recorded. The recording unit for the relative state, i.e. the one or more sensors 116, is connected to the data interface 114 in order to exchange data, as indicated by the arrow in FIG. 2. Via this connection, relative state values from the sensors 116 are made available via the data interface 114 to the computing unit 122 so that the computing unit 122 knows the relative states values of its own platform.

The absolute state values are determined with reference to an external coordinate system and are output in this external coordinate system or into a different transferable external coordinate system. Conversely, the recorded relative state values relate to a different member of the association.

The first filter unit 120 has a computing unit 122 for correction value calculations, a filter 124, e.g. a Kalman filter, with an error model 125 of the inertial navigation system and a computing unit 126 for the derivation of the relative states. The first filter unit 120 receives absolute state values, relative state values in relation to other objects and also the associated covariances of the absolute and relative state values and the absolute state values received via the data connection from other objects, including the covariance and the relative state values, including the covariance. If the covariance is not present or transmitted, it can also be estimated by means of suitable models or methods.

The second filter unit 130 is a fallback option or replacement system for the first filter unit 120. The output values of the second filter unit 130 are used if the first filter unit 120 has failed or if the first filter unit 120 does not receive all values necessary for its function (this state can also be referred to as an error state of the first filter unit 120). The second filter unit 130 is designed so that it requires only the data which can be determined in the aircraft 100 itself. There is therefore no need for the second filter unit to receive, for example, GNSS values or values which arrive via the data interface 114, but it suffices instead to receive only state values which are provided by sensors on board the aircraft 100.

The second filter unit 130 has a first filter 132 with a dynamic model 133 of the other aircraft, and a second filter 134 with a movement model 135. The first filter 132 and the second filter 134 use relative state values and absolute state values from an inertial navigation system in order to estimate autonomously the relative states in relation to other aircraft in the association. For initialization and in nominal operation, the second filter unit can also access further data, for example data which are received via the data connection or data from the first filter unit.

In an alternative embodiment, the absolute state values can be dispensed with for the second filter unit.

The monitoring unit 140 monitors the state of the recording unit 110 and/or the first filter unit 120. If the components of the recording unit 110 record or receive data (the absolute navigation methods, or at least the inertia platform, optionally the sensors for the relative state values and the data interface, receive values from other objects in the association of objects) and if the first filter unit 120 performs its functions, a state value of the first filter unit is used for the aircraft 100. However, if no data are received from other objects via the data interface 114 and the estimated relative precision of the first filter unit falls below that of the second filter unit or the first filter unit 120 is not functioning correctly, the monitoring unit 140 switches over to the second filter unit 130 for the relative state values and transmits a corresponding status signal 144. However, if the data connection is not available, absolute state values which are consistent with the absolute state values of the other members at the time when the fault occurs continue to be provided. This consistency (relative precision between the absolute states of the members) degrades here as time progresses up to a certain limit if at least one absolute drift-free navigation method remains available to all members, otherwise the consistency degrades indefinitely.

The monitoring unit 140 provides an absolute state value 142 of its own state, an associated absolute state covariance, a relative state estimation 146, an associated relative state covariance and a status signal 144.

The first filter unit 120 provides absolute state values with high relative precision, and also relative state values which are derived from the absolute state values. The computing unit 122 for correction value calculations receives relative state values, including associated covariances, and absolute state values, including associated covariances, from its own vehicle, and also relative and absolute state values, including associated covariances from the other vehicles which are transmitted via the data connection in order to calculate correction values for the entire association. A member's own correction value is used in the first filter unit so that the absolute state values of the members reflect the actual geometry (not restricted to position states) of the association as faithfully as possible, and the absolute state error of the entire association is minimized.

The filter 124 is preferably a Kalman filter and uses an error model 125 of the inertial navigation system and therefore ensures relatively long time stability of the absolute state values and implicit relative precision associated therewith in the absence of absolute and/or relative measurements and/or the data connection, insofar as a consistent absolute state estimation of the members has previously been ensured. The filter 124 filters the correction values which are provided by the computing unit 122 and which take account of the absolute and relative state values, including the respective covariances of the association as a whole, so that the output values of the filter 124 are synchronized and consistent with one another for the different members of the association, since these output values are based on the same uniform input values.

In the event of an error, the second filter unit 130 operates autonomously and independently from the first filter unit 120. The second filter unit 130 is designed to operate autonomously and, in the event of an error, uses states which are recorded on board the aircraft without external data, so that the second filter unit 130 can determine a relative state value even if no absolute navigation methods, such as, for example, a GNSS navigation method, are present and no data are received via the data interface. In one example, the second filter 130 uses data which it receives from the inertial navigation system and from the sensors for relative state determination. For initialization and in the nominal case (with everything functioning correctly), external data sources, such as, for example, GNSS, and the data connection can also be used.

If no absolute navigation methods or only the inertial navigation platform is available and/or no data are received via the data interface, the absolute and therefore the relative implicit and/or explicit precision of the state value supplied by the first filter unit will possibly decrease. In this case, the monitoring unit uses the relative state value provided by the second filter unit.

The computing unit 122 for the correction value calculation operates as follows:

The correction values $\delta x_i$ are intended to be calculated in such a way that the new absolute states $(x_{new,i}=x_{old,i}+\delta x_i)$ resulting therefrom reconstruct the recorded state values $\check{z}_{ij}$ of the object i in relation to the object j and therefore ultimately the relative geometry of the association:

$$\check{z}_{ij}=h((x_{old,j}+\delta x_j)-(x_{old,i}+\delta x_i)) \quad (1)$$

The "measurement equation" h is a function which calculates the expected recorded relative state values from the difference between the absolute states i and j and possibly other variables.

Equation (1) is devised for all relative state values recorded in the association, resulting in an equation system which must be solved for the correction values. All correction values are coupled with one another by means of the equation system and can be solved only as a whole, so that all absolute and relative state values and any associated covariances must be transmitted in order to provide the same uniform information status for all members or make it available to the central unit.

Equation system (1) may not initially be uniquely solvable, since the relative geometry of the members of the association and therefore the relative state values can be shifted randomly in the absolute state space, as can be indicated through the use of a random offset for all correction values:

$$\check{z}_{ij} = h((x_{old,j} + \delta x_j + \Delta x) - (x_{old,i} + \delta x_i + \Delta x)) =$$

$$h\left((x_{old,j} + \delta x_j)\underbrace{+\Delta x - \Delta x}_{=0} - (x_{old,i} + \delta x_i)\right)$$

However, since the recorded relative state values have no absolute reference point, they cannot influence the (weighted) centre of gravity of the association—the weighted centre of gravity must therefore remain unchanged. This boundary condition is expressed mathematically in that the weighted sum of the correction values equals 0:

$$W_Q^{-1}\sum_{i=1}^{n}Q_i^{-1}\delta x_i = 0 \quad (2)$$

where n represents the number of members of the association, $W_Q$ represents the normalization with $W_Q=\Sigma_{i=1}^{n}Q_i^{-1}$ and the inverse of the covariance of the correction value $Q_i^{-1}$ is chosen as the weighting. The choice of the inverse of the covariance of the correction value as the weighting is statistically optimal in terms of the weighted centre of gravity of the association. As a result, a correction value of a smaller amount is assigned to the members of the association with a precise absolute state (small covariance) compared with the members of the association with an imprecise absolute state (large covariance), so that the precise state requires hardly any correction.

Since boundary condition (2) ("weighted centre of gravity remains unchanged") is defined only in relation to the weighted centre of gravity of the association, the resulting relative state values can continue to be rotated around the weighted centre of gravity in the absolute state space. In order to eliminate this degree of freedom, a further boundary condition is added to equation system (1) which restricts the weighted distances between the old and new absolute states—for example by mounting virtual springs between the old and new states with a certain neutral position in order to yield a certain mobility, and a certain spring stiffness in order to reflect the weighting.

The covariance of the correction value $Q_i$ introduced into boundary condition (2) is initially unknown and must in turn be solved by means of an equation system which is obtained from the linearized form of equation (1):

$$H_{ij}\underbrace{\text{Var}(\delta x_j - \delta x_i)}_{Q_i+Q_j-2Cov(Q_i,Q_j)} H_{ij}^T = \text{Var}(\check{z}_{ij} - h(x_{old,j} - x_{old,i})) \quad (3)$$

$$\text{where } H_{ij} = \left.\frac{\partial h(x)}{\partial x}\right|_{x=x_j-x_i}.$$

Equation system (3) may not initially be uniquely solvable, and so a similar boundary condition is introduced according to boundary condition (2). This boundary condition means that the sum of the weighted covariances of the correction values represents a spherical error ellipse which reflects the optimality of the solution:

$$\text{Var}\left(W_Q^{-1}\sum_{i=1}^{n}Q_i^{-1}\delta x_i\right) = W_Q^{-1}\sum_{i=1}^{n}Q_i^{-1}\underbrace{\text{Var}(\delta x_i)}_{Q_i}Q_i^{-T} = I$$

Since $Q_i$ is not known, $Q_i$ can be approximated with the covariance of the old state or, alternatively, the equation system can be solved using iterative methods.

In general terms, the correction value is calculated in the computing unit 122 and transferred to the filter 124. The member's own corrected absolute state is determined in the filter 124. Using its own absolute state and the absolute states of the other members of an association, the computing unit 126 determines the relative state of its own object in relation to the other members.

Figure 3:
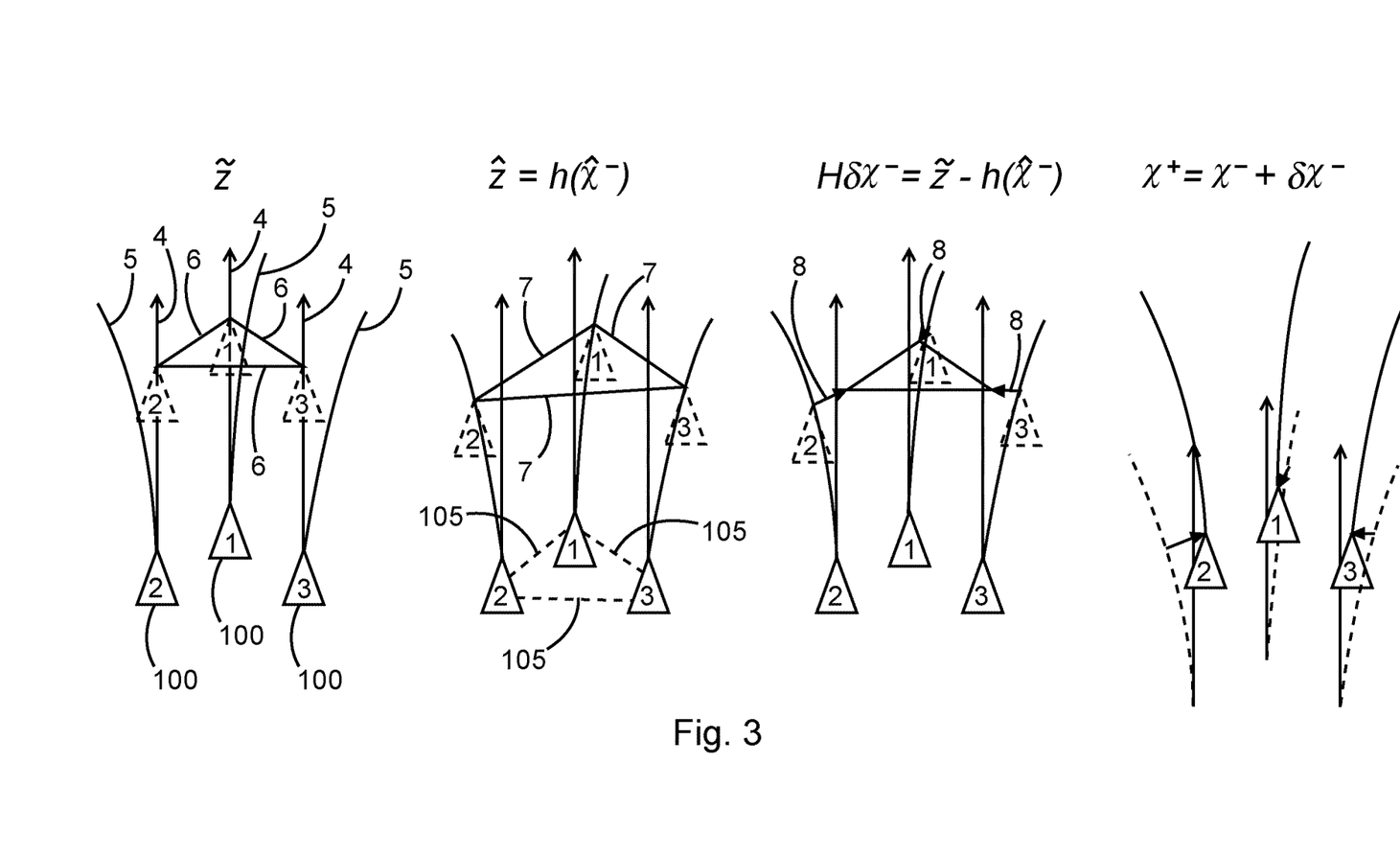
FIG. 3 shows a schematic illustration of the steps for calculating a correction value for a vehicle state in a vehicle association according to a further exemplary embodiment.

FIG. 3 illustrates the mode of operation of the computing unit 122 for the correction value calculation from FIG. 2.

FIG. 3 shows three aircraft 100, numbered with digits 1, 2, 3. These aircraft are moving in each case along an actual trajectory 4.

The representation on the far left shows a movement path of the aircraft 1, 2, 3 along the trajectory 4. The recorded absolute state 5 is based on an inertial navigation system. This absolute state 5 deviates further and further (the "drift") from the actual trajectory at a later time (aircraft drawn by broken lines). The drift of the individual aircraft can be different. The absolute state of the aircraft 2, for example, drifts to the left and the absolute state of the aircraft 1 and 3 to the right, wherein the absolute state of the aircraft 3 drifts more strongly to the right than that of the aircraft 1. The recorded relative states between the aircraft 1, 2, 3 are further indicated by the lines 6. The recorded relative states, including the associated covariance, and the recorded absolute state values, including the associated covariance, are exchanged between the aircraft via a data connection 105.

The second representation from the left shows that the expected relative state values 7 are determined on the basis of the recorded absolute state values 5. The correction values 8 are calculated by all members for all members of the association, as shown in the third representation from the left. The members apply their own correction value so that the determined absolute state values reflect the recorded relative states, and so that the absolute error of the association is simultaneously minimized. The actual relative configuration of the members in relation to the absolute state values is thus restored. Alternatively, a central unit calculates the correction values of all members and transmits the correction values to the corresponding members which apply the correction value to their own absolute state.

The representation on the right shows that the calculated correction value is used in the filter 124 in order to correct the state value. Alternatively, a predictor-corrector operating principle can be used, i.e. the correction value is applied directly. New absolute state values are obtained for each of the aircraft 1, 2, 3 from the former absolute state values which are indicated by broken lines.

In order to be able to calculate the correction values, the recorded relative state values are compared with the expected relative states according to the absolute state values of the filters. The correction values correspond to the difference between a recorded and an expected relative state value, transformed by means of the observation matrix H from the absolute state space into the measurement space of the relative states, expressed by the formula $H\delta x^- = \tilde{z} - h(\hat{x}^-)$. The members' own state values are not sufficient for determining the expected relative state values with reference to moving objects. The term "moving objects" is defined as meaning that their state changes over time or changes non-deterministically—an example of a deterministic change would be the rotation of the earth which can be compensated on the basis of the object itself.

The state values of the moving objects are necessary in order to deal with the circumstance that the absolute states and the relative states are defined in fundamentally different coordinate systems (the absolute state values are defined in relation to an absolute coordinate system, whereas the relative states relate to a moving object). By exchanging the absolute state values between members of the association, the expected relative states can be calculated on the basis of the difference of the absolute state values.

A correction value can then be theoretically determined on the basis of the comparison between recorded relative state values and the expected relative state values which are determined on the basis of the difference of the absolute state values. However, these resulting theoretical correction values cannot yet be assigned uniquely to the members of the association, since a plurality of correction values can be superimposed in different ways. This ambiguity can be resolved by introducing the boundary condition, as set out above, that the weighted sums of all correction values equal 0. The weighting is applied according to the inverse of the covariance of the correction values, as described above.

The computing unit 122 for the correction value calculation operates in such a way that the absolute states of the members of the association resulting from the application of the correction values are determined consistently, i.e. the relative geometry of the association in relation to the absolute state values is correctly reconstructed. If no absolute drift-free navigation method is available in the entire association, the determined absolute state values of the association drift as a whole, since the individual solutions of the first filter unit of the members of the association are synchronized on the basis of the correction value calculation which is carried out on the basis of the same uniform information status for all members, the drift being due to the inertial navigation systems. The precision of the absolute state values of the entire association or, viewed from a different perspective, the precision of the weighted centre of gravity of the association in relation to the absolute state values is statistically less than the precision of the absolute state values of an individual, random object of the association. As soon as an individual aircraft in the association has an absolute drift-free navigation method at its disposal, the determined absolute state values of all members have long-term stability due to the synchronization by means of the correction values. Members of the association with sensor failures are supplied with state values by other members of the association, i.e. via the data connection between the members of the association.

The following summary provides an overview of the interaction between the objects in the association and the functions of an individual member of the association:

A member of the association transmits the determined absolute state values and the associated covariance, and also recorded relative state values and the associated covariance to other members of the association.

The computing unit 122 of the members of the association determines the observation matrix H of the recorded relative state values of the entire association $$\left(H_{ij} = \frac{\partial h(x)}{\partial x}\right),$$

determines the covariance of the correction values in the state space of the entire association (Q), determines the measurement residual in the measurement space between the recorded relative state and the expected relative state in relation to the absolute state values of the entire association ($\delta z^- = \tilde{z} - h(\hat{x}^-)$ determines the correction values in the state space of the entire association ($H\delta x^- = \delta z^-$) using the boundary condition of the weighted centre of gravity of the association $$\left(W_Q^{-1} \sum_{i=1}^{n} Q_i^{-1} \delta x_i = 0\right),$$

and determines the correction values in the state space of the entire association, taking account of the second boundary condition of the springs.

The filter 124 uses the part of the correction values and the correction value covariance which corresponds to its own member of the association for the correction of its own (estimated) state values.

The relative explicit state determination and the relative implicit state determination are described below on the basis of the absolute state values, along with their implication for a regulation or control system.

In the case of the explicit relative state determination, the relative state is calculated on the basis of the difference of the absolute state values, whereas the relative state is not actually calculated for the implicit relative state determination. A regulation or control system regulates/controls accordingly on the basis of the relative state values in the case of the explicit relative state determination, whereas the absolute state determination is used in the case of the implicit relative state determination.

The absolute state determination of one member of the association having the same validity date as the state determination of the other members of the association is explicitly subtracted from the absolute state determination of the other members of the association in order to obtain a relative state determination. However, the present absolute state determination of the other members of the association and therefore this explicit relative state determination are older than a member's own latest absolute state determination, due to the latency of the processing components (in particular the data connection) which are used in order to obtain the absolute state determination from the other members of the association. Alternatively, the received data can be propagated in order to obtain the same validity date as for a member's own absolute state determination, but this results in an error proliferation due to the propagation.

The second possibility provides that the relative state determinations are not determined explicitly by the members of the association. The therefore implicit relative state precision can be determined only in postprocessing or in a simulation. As long as each member of the association does not leave its flight corridor (taking into account the uncertainty of the state determination), the members of the association do not have to know the relative state explicitly in relation to one another, and so no flight control laws based on relative state determinations are necessary in this case. However, it is assumed here that the absolute state determination of the members of the association is consistent, which is ensured by the first filter unit 120.

The systems and devices described herein may include a controller or a computing device comprising a processing and a memory which has stored therein computer-executable instructions for implementing the processes described herein. The processing unit may comprise any suitable devices configured to cause a series of steps to be performed so as to implement the method such that instructions, when executed by the computing device or other programmable apparatus, may cause the functions/acts/steps specified in the methods described herein to be executed. The processing unit may comprise, for example, any type of general-purpose microprocessor or microcontroller, a digital signal processing (DSP) processor, a central processing unit (CPU), an integrated circuit, a field programmable gate array (FPGA), a reconfigurable processor, other suitably programmed or programmable logic circuits, or any combination thereof.

The memory may be any suitable known or other machine-readable storage medium. The memory may comprise non-transitory computer readable storage medium such as, for example, but not limited to, an electronic, magnetic, optical, electromagnetic, infrared, or semiconductor system, apparatus, or device, or any suitable combination of the foregoing. The memory may include a suitable combination of any type of computer memory that is located either internally or externally to the device such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. The memory may comprise any storage means (e.g., devices) suitable for retrievably storing the computer-executable instructions executable by processing unit.

The methods and systems described herein may be implemented in a high-level procedural or object-oriented programming or scripting language, or a combination thereof, to communicate with or assist in the operation of the controller or computing device. Alternatively, the methods and systems described herein may be implemented in assembly or machine language. The language may be a compiled or interpreted language. Program code for implementing the methods and systems described herein may be stored on the storage media or the device, for example a ROM, a magnetic disk, an optical disc, a flash drive, or any other suitable storage media or device. The program code may be readable by a general or special-purpose programmable computer for configuring and operating the computer when the storage media or device is read by the computer to perform the procedures described herein.

Computer-executable instructions may be in many forms, including modules, executed by one or more computers or other devices. Generally, modules include routines, programs, objects, components, data structures, etc., that perform particular tasks or implement particular abstract data types. Typically, the functionality of the modules may be combined or distributed as desired in various embodiments.

It should additionally be noted that "comprising" or "having" does not exclude other elements or steps and "a/an" or "one" does not exclude a multiplicity. It should further be noted that features or steps that have been described with reference to one of the above exemplary embodiments can also be used in combination with other features or steps of other exemplary embodiments described above. Reference symbols in the claims are not to be regarded as a restriction.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

REFERENCE SYMBOL LIST

1 Vehicle
2 Vehicle
3 Vehicle
4 Actual trajectory
5 Recorded absolute state
6 Recorded relative state
7 Expected relative state
8 Correction value
10 Method
11-16 Method steps
100 Vehicle
105 Data connection
110 Recording unit
112 Unit for absolute navigation methods
114 Data interface
116 Sensor (relative state determination, optical sensors, camera, lidar)
120 First filter unit
122 Computing unit for correction value calculation
124 Filter
125 Error model for sensors
126 Computing unit for determining a relative state value
130 Second filter unit
132 Filter
133 Dynamic model of the other vehicles
134 Filter
135 Movement model 140 Monitoring unit
142 Member's own absolute state determination
144 Status output
146 Relative state determination

The invention claimed is:

1. A vehicle comprising: a recording unit configured to record absolute and relative state values of the vehicle, wherein the recording unit has one or more sensors for determining the absolute and the relative states, and wherein the recording unit has a data interface configured to transmit the own relative and absolute states of said vehicle and to receive relative and absolute state values from objects in an association; storing, by a server, an operation schedule of the plurality of circulating buses;
   a first filter unit configured to process the absolute and relative state values recorded by the recording unit in order to determine a corrected absolute state value and a corrected relative state value of the vehicle in relation to other objects in the association using a method comprising steps of:
   each object in the association recording an absolute state in an existing coordinate system for said each object;
   a first object in the association recording a relative state of the first object in relation to one or more other objects in the association;
   the first object transmitting, via a data connection, the recorded relative state and the recorded absolute state of the first object to the one or more of the other objects in the association;
   exchanging recorded relative states and recorded absolute states in the association of objects so that all objects in the association have a same uniform information status;
   each object calculating a correction value for all objects in the association based on the same uniform information status, and,
   an object from the association applying the correction value of said object to the recorded absolute state of said object;
   a second filter unit configured to process the absolute and relative state values recorded by the recording unit in order to determine a relative state value in relation to other vehicles as an output value; and
   a monitoring unit configured to monitor a status of the first filter unit and the second filter unit;
   wherein one or more controls of the vehicle executes adjustments based on at least one of the determined relative state value in relation to the other objects or the determined relative state value in relation to the other vehicles; and
   wherein the monitoring unit is configured to forward the corrected absolute state value and the corrected relative state value from the first filter unit when a normal operational state has been identified for the first filter unit, or otherwise to forward the relative state value from the second filter unit when an incorrect operational state has been established for the first filter unit or when an estimated relative precision of the second filter unit is better than the estimated relative precision of the first filter unit.

2. The vehicle according to claim 1,
   wherein the monitoring unit is configured to categorize the status of the first filter unit as an incorrect operational state when no data connection is set up via the data interface of the recording unit.

3. The vehicle according to claim 1,
   wherein a covariance associated with each recorded absolute state and recorded relative states is also exchanged along with the relative states and the absolute states.

4. The vehicle according to claim 1,
   wherein an absolute error value of the association of objects is minimized for calculating the correction value.

5. The vehicle according to claim 1,
   wherein the correction value is used in a filter of at least one object in order to correct a absolute state, a relative state, or both of the at least one object.

6. The vehicle according to claim 1,
   wherein a state value of the absolute state, the relative state, or both contains information relating to one or more of the following parameters of an object: position, speed, bearing, acceleration, rotational speed, relative position in relation to one or more other objects, relative distance in relation to one or more other objects, relative speed in relation to one or more other objects, relative bearing in relation to one or more other objects.

7. The vehicle according to claim 1, wherein a correction value is calculated in such a way that new absolute state values resulting therefrom reconstruct relative state values of the first object, i, in relation to a second object, j, and wherein a relative configuration of the objects in the association in relation to the absolute state values by applying the following equation: $\check{z}_{ij} = h((x_{old,j} + \delta x_j) - (x_{old,i} + \delta x_i))$.

8. The vehicle according to claim 7,
   wherein a boundary condition that a sum of correction values is equal to zero applies.

* * * * *